United States Patent [19]

Lamiral et al.

[11] Patent Number: 4,459,701
[45] Date of Patent: Jul. 10, 1984

[54] PROCESS AND DEVICE FOR SYNCHRONIZING AT RECEPTION DIGITAL SIGNALS TRANSMITTED IN PACKAGES

[75] Inventors: Jean P. Lamiral; Christian Auzet, both of Conflans Sainte Honorine, France

[73] Assignee: Lignes Telegraphiques Et Telephoniques, Conflans Ste Honorine, France

[21] Appl. No.: 339,652

[22] Filed: Jan. 15, 1982

[30] Foreign Application Priority Data

Jan. 16, 1981 [FR] France ................................ 81 00773

[51] Int. Cl.³ .............................................. H04L 7/04
[52] U.S. Cl. .................................... 375/110; 328/72; 328/133; 375/118
[58] Field of Search .................... 328/55, 72, 133, 155, 328/134; 370/100, 89, 94; 371/42; 375/95, 106, 110, 118, 119

[56] References Cited

U.S. PATENT DOCUMENTS

| | | | |
|---|---|---|---|
| 3,142,802 | 7/1964 | Maure | 328/55 |
| 3,819,853 | 6/1974 | Stein | 375/118 |
| 3,961,311 | 6/1976 | Pavoni et al. | 371/42 |
| 4,131,856 | 12/1978 | Chapman | 328/72 |
| 4,166,979 | 9/1979 | Waggener | 328/133 |
| 4,208,724 | 6/1980 | Ruttlingourd | 375/118 |
| 4,302,831 | 11/1981 | Zemanek | 375/118 |

OTHER PUBLICATIONS

Elektronic, vol. 27, No. 2, 1978, W. Beifuss, "Digitale Phasensynchronisiereinheit Fur Synchrone Datenubertragung", pp. 52–56.

1978 International Zurich Seminar on Digital Communications, Mar. 1978, T. Svensson: "Methods for Two-- Wire Duplex Digital Transmission at 80 KBit/s on Subscriber Lines", pp. c5.1–c5.4.

*Primary Examiner*—Benedict V. Safourek
*Attorney, Agent, or Firm*—Oblon, Fisher, Spivak, McClelland & Maier

[57] ABSTRACT

A process is provided for synchronizing at reception digital signals transmitted in packages which consists in generating the signals of a first window of given width at intervals corresponding to the timing of the on-line packages, in searching by detection for at least one transition in the signals received during the duration of each window, in modifying the interval between the beginning of a window signal and the beginning of the following signal in the case where the transitions detected do not correspond to a given criterion and in maintaining said interval equal to said on-line package timing and producing a synchronization signal fed to a package reading device in the opposite case. The device of the invention comprises a dividing counter which is reset by the transitions detected in the window so that the interval between the successive windows is modified until the synchronization is acquired, that is to say that the end of the window is located at the level of the synchronization transition $T_s$ at the beginning of a package.

22 Claims, 16 Drawing Figures

PROCESS AND DEVICE FOR SYNCHRONIZING AT RECEPTION DIGITAL SIGNALS TRANSMITTED IN PACKAGES

BACKGROUND OF THE INVENTION

The present invention relates to a synchronizing process and device for receiving digital signals transmitted in packages.

From the prior art it known to synchronize digitally the reception of transmitted signals by recognizing a synchronization pattern which is either associated with the transmitted information (synchronizing word or bit), or inherent in the code used for representing them (self-synchronizing codes).

In the case of digital transmission in packages, i.e. when the digital information is transmitted iteratively but discontinuously in time in the form of a plurality of packages spaced apart from each other and appearing at a given timing, the synchronizing devices of the prior art, usually limited to detecting a synchronization pattern, e.g.; in the form of a transition present at the beginning of the package, are likely to produce false synchronization or desynchronization when parasites are present on the line and even, should the occasion arise, locking of the synchronization on a series of repetitive parasite pulses.

SUMMARY OF THE INVENTION

The present invention thus has as object a synchronizing process and device not presenting the above defects while providing however rapid synchronization.

The invention relates then to a process for synchronizing, at reception, digital signals transmitted in packages which comprises a phase for detecting the transitions received and a phase for recovering the timing of the on-line packages. It is characterized in that it comprises the following operations:

(a) generating signals of a first window of given width at gaps corresponding to the timing of the on-line packages;

(b) detecting at least one transition possibly present in the signals received during the duration of each window and determining whether the transition(s) detected during the duration of each window satisfy a given coincidence criterion;

(c) if the criterion is not satisfied, modifying the interval between the beginning of a window signal and the beginning of the next window signal, this forming a step seeking synchronization;

(d) if the criterion is satisfied, maintaining said interval equal to said timing of the on-line packages and producing a signal representative of the synchronization, this forming a synchronization acquisition and holding step.

The invention also relates to a device for synchronizing at reception digital signals transmitted in packages, which is provided with a device for reading the transitions present in the signals received as well as a circuit for retrieving the timing of the on-line packages. It is characterized in that it comprises:

a generator producing a first window signal of given width at intervals corresponding to the timing of the on-line packages;

a coincidence detector receiving the signals from the transition reading device as well as said window signal and producing at its output a coincidence signal;

a circuit receiving the coincidence signal and producing a signal for decrementing the interval between the beginnings of two successive windows when said coincidence signal does not satisfy a given coincidence criterion and maintaining said interval at a value equal to said timing of the on-line packages in the opposite case;

at least one circuit producing a signal representative of the synchronization.

BRIEF DESCRIPTION OF THE DRAWINGS

The invention will be better understood from the following description given by way of nonlimiting example with reference to the accompanying drawings in which:

FIG. $1_a$ is a transcoding diagram during a transmission;

FIGS. $1_b$ and $1_c$ show packages such as used in the digital transmissions;

FIG. 2 shows a synchronization circuit of the prior art, used in the case of a digital transmission in packages;

FIGS. $3_a$, $3_b$ and $3_c$ illustrate the synchronization achieved in accordance with the invention and using a window signal;

FIG. $6_a$ represents a block diagram of one embodiment of the device shown in FIG. 3;

FIG. $6_b$ shows a status diagram of an acquisition and synchronization loss criterion;

FIG. $6_c$ illustrates an embodiment of the circuit for forming an acquisition and synchronization loss criterion mentioned in FIGS. $6_a$ and $6_b$ and which is derived from a diagram proposed by the Comité Consultatif International Télégraphique et Téléphonique (CCITT);

FIG. $6_d$ is a status diagram showing the operation of the circuit described in FIG. $6_c$;

DESCRIPTION OF THE PREFERRED EMBODIMENTS

Figure 1A:
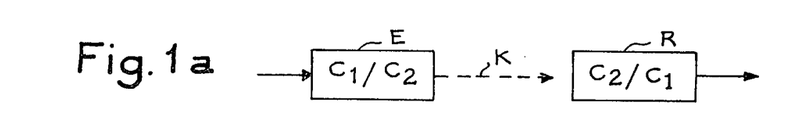

FIG. $1_a$ illustrates a transcoding operation, current in digital telephony and which is carried out at emission in a module E as well as a reverse transcoding operation carried out at reception in a module R. The information present at the input of module E is coded according to a code $C_1$. The function of module E is to transcode this code into a code $C_2$ which is adapted to transmission by a line or more generally by a transmission channel K. The function of reception module R is to carry out the reverse transcoding of code $C_2$ so as to retrieve code $C_1$ which is in general a binary code. The choice of code $C_2$ is dictated by properties the principal ones of which are generally:

compressing the passband normally required for transmission;

removing the need for transmission of the DC component;

containing information for reconstitution of a clock (timing) and allowing nonambiguous coding;

giving intrinsically error detection.

For example, the 1B/2T code has been studied by C. AUZET in his article "Etude d'une famille de codes applicables à un système de transmission numérique à faible débit" published in the "Revue Technique THOMSON-CSF", (Vol. 12 No. 3—September 1980 pages 615 to 643).

In the case of a digital transmission in packages, retrieval of the timing of the on-line packages is provided by the presence of a transition at the beginning of a package. The package-beginning transitions, or more generally the latching patterns, are produced in module E, either with increase of the binary flow by systematic insertion of a transition or a latching pattern at the beginning of a package, or without increase of the binary flow by using a special self-synchronizing code $C_2$, i.e. a code each transcoded word of which begins by a bit producing a transition at the beginning of the word, for example a positive or negative pulse for a n level code. At reception, the reading of such a fixed and repetitive element must allow the timing of the on-line packages and the reading synchronization to be recovered.

Figure 1B:
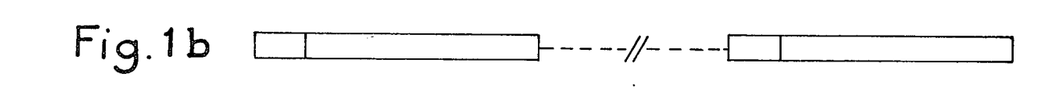

FIG. $1_b$ illustrates therefore a digital transition by packages where packages are equally spaced in time and comprise at their beginning a synchronization pattern, for example a transition.

Figures 1C, 2:
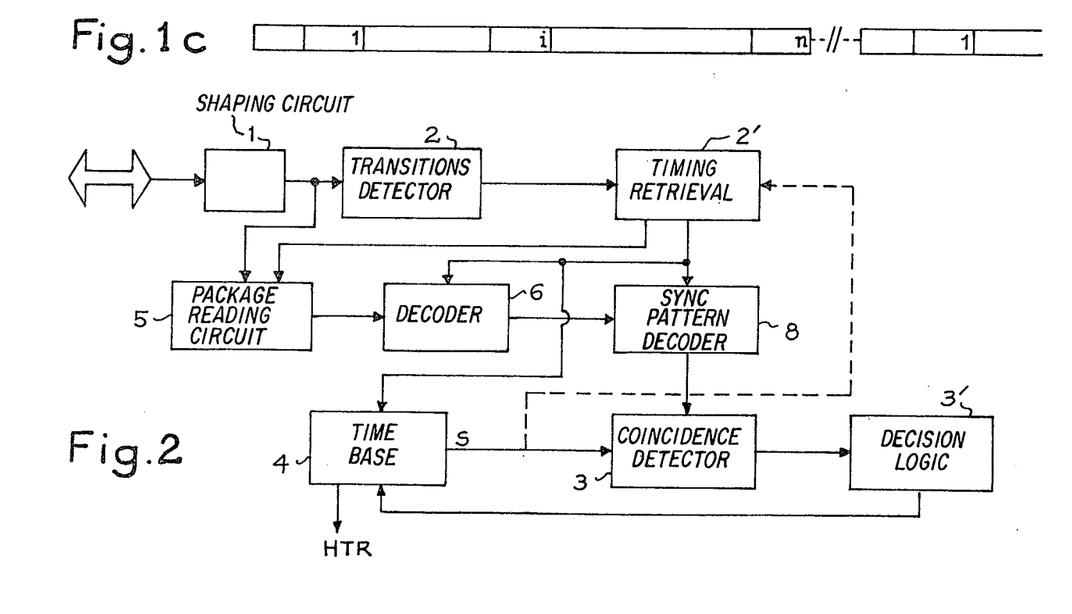

FIG. $1_c$ shows a particular case of FIG. $1_b$, where each package, which comprises at its beginning a synchronization pattern, is subjected to n channel multiplexing numbered from 1 to n and whose digital signals appear successively. Such digital transmission in equally spaced packages and comprising multiplexing is currently carried out in telephony.

These types of transmission are generally effected by rotation, that is to say following a procedure which consists in emitting a series of information, such as a digital information package, at one end of the channel, in receiving it at the other, then in emitting another information package in the opposite direction and so on. Synchronization at reception of such packages is generally achieved by retrieving the timing of the on-line packages and selecting, as synchronization transition, the first transition present at the beginning of the package. Such a synchronization is described in FIG. 2, where the signals from a line are subjected to a shaping operation in circuit 1 then, in circuit 2, to an operation for reading the transitions present in the line. A timing retrieval circuit 2' receives the transitions read at 2 and transmits to the package-reading circuit 5 a synchronized signal corresponding to the timing of the on-line transitions. Circuit 5 also receives the transitions shaped by circuit 1. The packages read by circuit 5 are fed to a decoder 6 whose function is to carry out the reverse transcoding mentioned above in connection with the description of FIG. $1_a$. Decoder 6 as well as a time base 4 receive from timing retrieval circuit 2' a synchronized clock signal corresponding to the beginning of each transcoded word. The output of decoder 6 is connected to a synchronization pattern decoder 8. The synchronization pattern may be simply a transition present at the beginning of the package.

Time base 4, which is generally a counter in which the count is equal, but for a factor, to the number of binary elements corresponding to the timing of the on-line packages, and which is reset by the timing retrieval circuit 2', produces at its output S a signal the timing of which is the same as that of the on-line packages, as well as a signal (HTR) representing the beginning and the end of a package. The assembly of circuits 2' and 4 thus allows the timing of the on-line packages to be retrieved.

The outputs of decoder 8 and time base 4 are fed into a coincidence detector 3 whose output is connected to the input of a decision logic 3'. The output of logic 3' resets the time base 4 when the coincidence between the synchronization pattern and the time base is present iteratively according to a criterion fixed beforehand. In the opposite case, the criterion determines a synchronization loss sequence. Finally, if the code is not self-synchronizing, the output S of time base 4 is also used for bringing into phase the synchronized clock signal intended for reading each word.

Such synchronization is sensitive to all the parasite pulses present between packages and which disturb the recognition of the synchronization pattern. It is thus likely to be easily desynchronized in the presence of fairly small on-line parasite rates.

The present invention relates then to a process and device for synchronizing at reception digital signals transmitted in packages, and more particularly but not exclusively in the case of transmission by rotation, and avoiding poor synchronization or desynchronization on parasites, more particularly isolated or repetitive, present between packages. The process and the device of the invention are advantageously used in the case of transmission by rotation where the presence of a large interval between packages increases the probability of erroneous synchronization on parasite pulses.

Figure 3A:
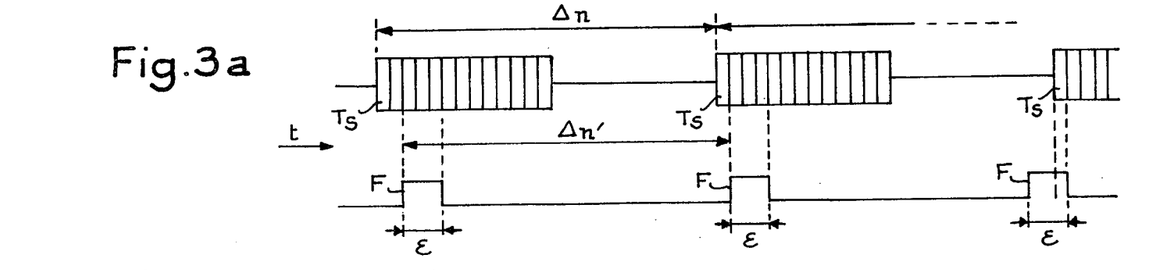

The diagram of FIG. $3_a$ illustrates the process of the invention, where a window signal F of given width $\epsilon$ is generated in stabilized phase at intervals $\Delta n$ corresponding to the timing of the on-line packages which is retrieved from a circuit receiving the transitions read at reception. This window, shown in the form of a squarewave, comprises a transition which indicates its beginning and a transition which indicates its end. Any transition present in the signal received between the beginning and the end of the window constitutes a coincidence. It will be noted that the term window covers any signal or series of signals allowing time coincidences to be provided with one or more transitions. The logic processing of these coincidence signals, in accordance with a coincidence criterion, enables a decision to be made as to possible modification of the interval between two successive windows, so that this latter finishes by being positioned at the beginning of the package. Thus, at the beginning of package reception shown in FIG. $3_a$, which packages are separated by constant intervals $\Delta n$, the first window F of width $\epsilon$ which is for example situated in the first package received will be followed by a second window F of width $\epsilon$ separated by an interval $\Delta n'$ smaller than interval $\Delta n$, this operation continuing from package to package as long as the transition(s) detected during the duration of a window do not correspond to a given criterion. This forms a step seeking synchronization. Window F will thus move gradually back to the beginning of the package while positioning itself preferably so that the synchronization transition $T_s$ present at the beginning of each package is located at the end of the window. The coincidence criterion mentioned above may be chosen so that it is satisfied when a synchronization transition $T_s$ is present in a chosen part of window F, for example at the end thereof. When the coincidence(s) detected during the duration of a window satisfies the chosen coincidence criterion, the interval between it and the next window is maintained equal to the interval Δn corresponding to the timing of the on-line packages. This forms a synchronization acquisition step. After confirmation, if required, the synchronization is acquired (holding step). The use of such a process employing a window ensures that the setting of the synchronization is always correct, since the transitions serving for synchronizing the reading of the packages will always have to satisfy the above-mentioned criterion. The result is that, should the criterion no longer be satisfied, possibly after confirmation, a new synchronization seeking step will take place and the interval between the successive windows will be modified until the synchronization is again acquired. A synchronization signal will be only significant during the acquired synchronization step.

Figure 3B:
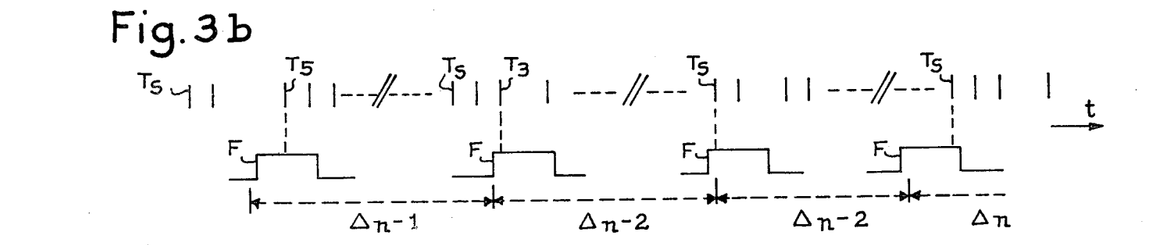

By way of nonlimiting example, a usable coincidence criterion consists in detecting the position of the first transition present in the window. The next window signal will be generated so that the end thereof is separated from said first transition by an interval equal to the timing of the on-line packages. Thus, all the transitions detected in a position situated before the end of any window will cause decrementation of the interval between the windows and movement thereof back to the head of the package. Such synchronization is shown in FIG. $3_b$ where the first transition detected in the window, whose width is for example three elements and corresponding to the first package received, is transition $T_5$ situated 4 elements after the synchronization transition $T_s$. In the next package, the end of window F is situated at the level of the fifth transition of the package. The first transition detected in the window is the transition $T_3$. In the next package, the end of window F whose width corresponds to 3 elements, will be situated at the level of the third transition of the package. Thus, the first transition detected by the window will be this time the synchronization transition $T_s$. The result is that the synchronization may be acquired as early as the next package where the transition $T_s$ will be situated at the end of the window F or after confirmation effected in accordance with a logic criterion. The following windows F will be separated by intervals Δn corresponding to the timing of the on-line packages.

Figure 3C:
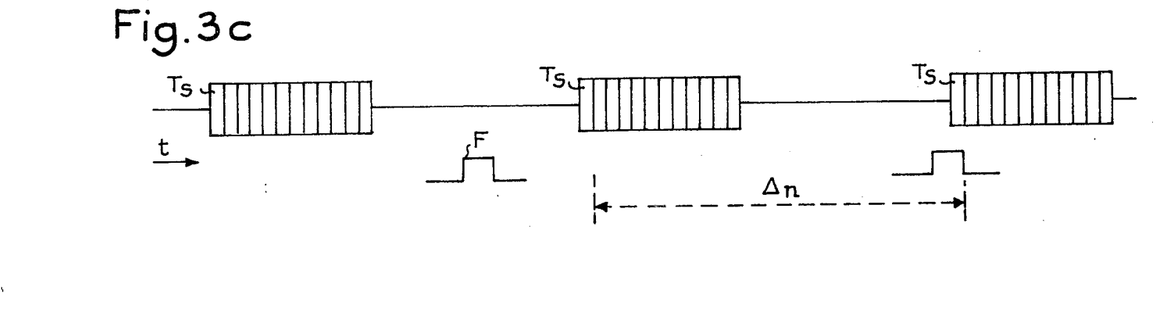

The case has been considered above where the first window produced is situated in a package. In the opposite case, no transition is observed during the duration of the window and it is therefore preferable, rather than shortening the interval between two successive windows, to wait for the first transition present on the line which, in the absence of disturbance, will be the synchronization transition present at the beginning of a package. This situation is illustrated in FIG. $3_c$, where the window F is located between two successive packages. The first transition detected will be the transition $T_s$ of the following package and the following window will then be generated so that the end thereof is separated from said transition $T_s$ of the second package by an interval Δn corresponding to the timing of the on-line packages. This configuration provides very rapid acquisition of synchronization.

The parameters will now be discussed for determining the width of the window in an optimal way in the case where a criterion is used relative to the position of a transition in the window. First of all, the width of the window cannot be less than that of two on-line elements, failing which the detection of the first transition could obviously in no case allow the window to move back up the package. Furthermore, it is preferable for the width of the window to be greater than the number of successive transition absences likely to occur in a package. This window width, when the window is located at the level of a package, ensures that at least one transition corresponding to a coincidence will be inevitably detected. However, this condition does not necessarily ensure that the window climbs back optimally along the package since a transition present at the level of the window might nevertheless be located at the end thereof and, fortuitiously, in a recurrent way. To avoid this drawback, it is advantageous to give to the window a width at least greater by 2 elements than the number of successive transition absences likely to exist in a package. One may thus be certain that two transitions will be present at the level of the window when this latter is located in a package, which will ensure climbing back thereof at each package until the synchronization is acquired. From the above description it will be understood that, the wider the window, the more rapid the acquisition of synchronization by moving back up a package and, on the other hand, the greater the sensitivity of the synchronization to parasite pulses present in the window. From this point of view, the determination of the width of the window will be obtained by compromising between the speed of synchronization and its relative insensitivity to the parasites present on the line.

According to a first variation, a usable coincidence criterion consists in counting the number of transitions present during the duration of the window. If this number is greater than 1, the interval between this window and the following window will be reduced by a quantity corresponding to at least one element. If this number is equal to 1, the interval between the window and the following window will be maintained at a value corresponding to the timing of the on-line packages. If the number is 0, the procedure will be as for the case of FIG. $3_c$. The choice of this criterion also allows the window to move back up to the package until the synchronization transition $T_s$ is at the end thereof. The conditions mentioned above as to the choice of the width of the window are valid in the case of this criterion, as they were also for the case of the preceding criterion.

According to a second variation, the coincidence criterion is the detection at the end of the window of a coincidence pattern. If it is not satisfactory, the interval between the windows is modified.

To avoid desynchronization should the transmission of a transition at the beginning of a package be defective, the process of the invention comprises an operation for synchronization detection when the criterion is satisfied by intermittence or not at all, said operation consisting in again carrying out a synchronization-seeking step, according to a decision logic criterion.

The above-described process ensures rapid and efficient synchronization of a digital transmission in packages, but however it remains liable to be desynchronized should a pulse due to a parasite appear at the level of the window and before the beginning of the package. A preferred embodiment of the invention consists then in generating a second window called reduced window, the beginning of which is the same as said window and which is shorter by an interval corresponding to an element and in detecting the absence of transition in said reduced window. Only the iterative presence of a transition in successive reduced windows produces resetting of the first window on the first transition detected. The resetting of the first window is thus delayed until it may be assumed, by the iterative presence of a transition in the window, that it is this latter which is in reality the synchronization transition, that is to say that there has for example been a drift of the synchronization pattern in the course of time. If transitions only appear intermittently or fleetingly in the reduced window, there is no modification of the interval between the first successive windows, since the unstable character of these transitions indicates that they are due to parasites present on the line. It should be noted that this operation for generating a reduced window is only useful during the synchronization acquisition and holding step. In fact, if such a window is generated during the so-called synchronization-seeking step, the moving back along the packages by the first window risks being very greatly slowed down.

Also as a variation, the process of the invention comprises logic decoding of the acquisition and/or of the holding of the synchronization which produces a reduction in the width ε of window F, preferably down to a single element.

There will now be described means for implementing the above process, with reference to a 1B/2T code by way of nonlimiting example (one-binary-element words transcoded into two ternary on-line elements).

Figure 4:
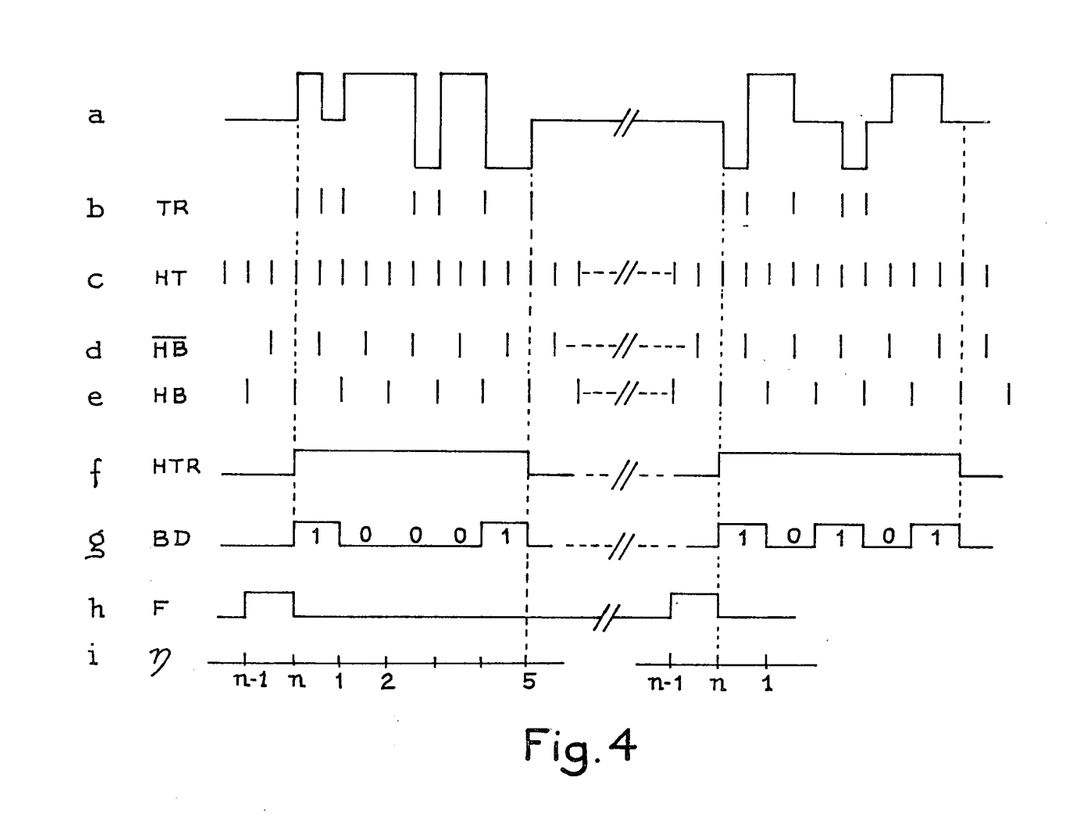
FIG. 4 represents significant signals of the synchronization in packages in the case of a 1B-2T code.

FIG. 4 shows at a the on-line signals shaped and corresponding to successive package each comprising ten elements, and at b the transitions TR read. A ternary clock HT is shown at c, which corresponds to the timing of the on-line transitions present, that is to say that it presents transitions separated by an interval of one element. A binary clock is derived from the ternary clock T by division by 2 (code 1B/2T) and thus corresponds to the timing of ternary words, and its two possible phases are designated respectively by $\overline{HB}$ at d and HB at e. When the synchronization is acquired, and if need be confirmed, the binary clock is reset, in principle to the beginning of each package, and supplies the signal HB permanently with the correct phase.

A signal HTR representing the beginning and the end of each package is shown at f in the form of an envelope signal. Finally, the decoded binary elements ED are shown at g. The three signals, HB, HTR and BD are supplied to the utilizer which allows it to read the binary information at the timing of clock HB, the signal HTR determining the position of the beginning and the end of each package. Window F is shown at h, positioned at the beginning of the package (synchronization acquired), whereas at i is shown the count of a counter used for producing the window signal and the HTR signal as will be described further on.

Figure 5:
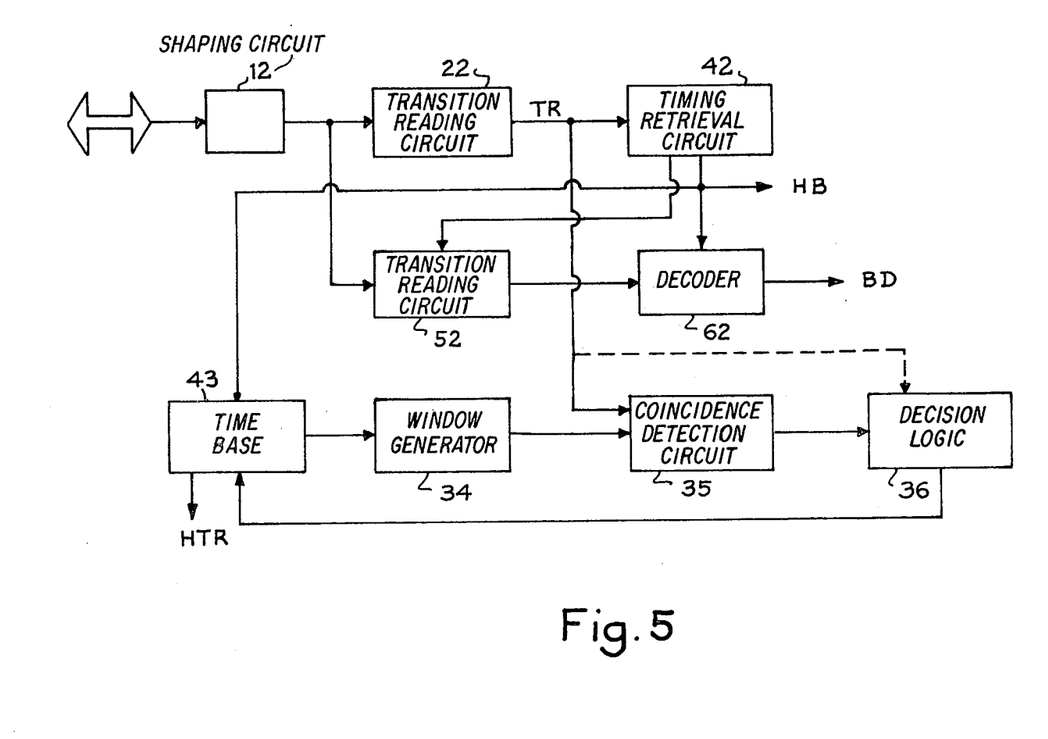
FIG. 5 represents a block diagram in accordance with the invention.

FIG. 5 shows a shaping circuit 12 receiving the on-line signals present and feeding them, on the one hand, into an on-line transition reading circuit 22 and, on the other hand, to a package reading cirucit 52. The transitions TR read by circuit 22 are fed to a timing retrieval circuit 42 as well as to a coincidence detection circuit 35. Circuit 42 supplies a line clock signal (ternary clock HT) to the package reading circuit 52. Circuit 42 produces, in the case of block codes, a word clock signal (binary clock HB) which is received by a decoder 62 and by a time base 43, which is in general formed by a dividing counter. This signal is derived from the line clock signal by a division operation (by 2 in the case of a 1B/2T code). The transitions read in circuit 52 are fed to decoder 62. The time base 43 receives the line clock signals HT or preferably the word clock HB and feeds into a window generator 34 a signal whose periodicity, under stationary conditions, corresponds to that of the packages. The coincidences detected during the duration of the window are fed to a decision logic circuit 36 which, on the one hand, will produce a signal for resetting the time base 43 and, on the other hand, a signal for synchronizing in direction the timing retrieval circuit 42.

As was mentioned above, in connection with FIG. 2, circuit 42 and time base 43 form a circuit for retrieving the timing of the on-line packages.

Let us consider the case where the time base 43 is a counter effecting a division in a ratio n, where n is the number of elements corresponding to the interval between the beginnings of two packages received, and which receives the line clock signals HT. The counter emits a pulse in the direction of window generator 34 when it has reached a count (n−p), p being the number of elements defining the width of the window F. In the absence of a resetting order from the decision logic 36, the time base supplies a control pulse to the window generator 34 at intervals corresponding to the spacing of the packages and the counter resets itself when it reaches the count n, moreover simultaneously with the arrival of the synchronization transition. On the other hand, when the decision logic circuit 36 delivers signals corresponding to a synchronization-seeking configuration, i.e. when a transition is present q elements before the end of the window, resetting of the time base before this latter has reached the count n, i.e. the count (n−q), will result in the following window being advanced by a corresponding count q.

It is however preferable, as shown in FIG. 5, to feed into the counter forming the time base 43 the signals HB of the word clock, the counter having in this case a division ratio equal to the number of words corresponding to the interval between the beginnings of two packages received. In this case, the width of the window will, short of providing a retarding element in the window generated, be equal to the number of elements forming each word (2 in the case in point) or a multiple thereof. The end of the window thus corresponds to the beginning of a word when the word clock HB is synchronized. Thus, referring to lines h and i of FIG. 4, a window F having a width of two elements is generated when the counter reaches the count n−1 and finished when this latter reaches the count n, simultaneously with the synchronization pulse. The envelope signal HTR ends when the counter reaches the count n−5 equal to the number of words in a package.

Figure 6A:
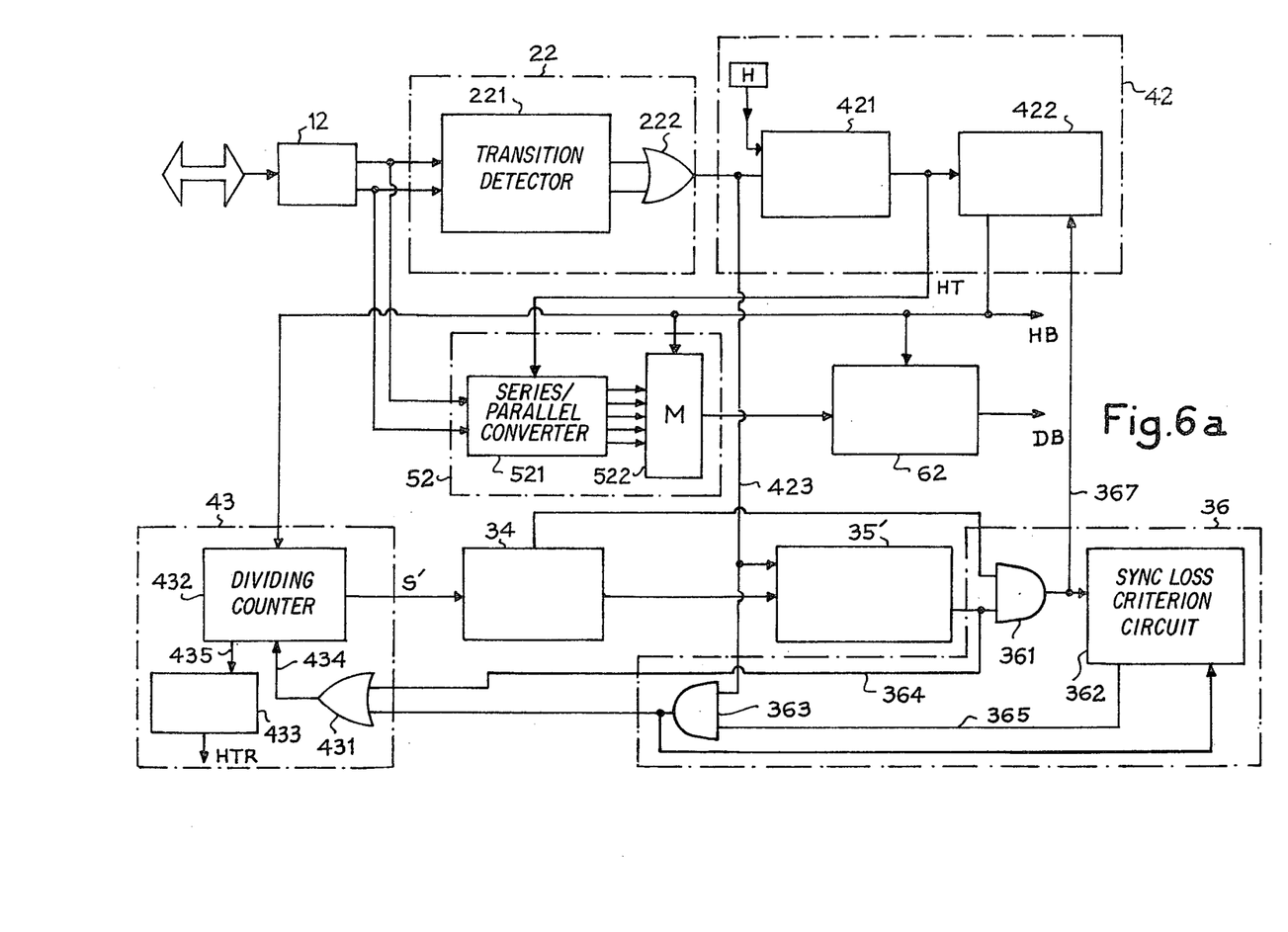

FIG. 6a shows one embodiment for the diagram of FIG. 5 which, by way of example, has also been described in the case of reception of ternary signals in which the words comprise two elements (code 1B/2T). Circuit 22 for reading the on-line transitions is formed by a + transition and − transition detector 221 whose output signals are applied to the input of an OR gate 222. Circuit 42 comprises a dividing counter 421 receiving the signals from a local clock H and which is reset by the signals present at the output of gate 222. The division ratio of the dividing counter is such that the output signals which it delivers form a line clock (ternary clock HT), that is to say that its timing corresponds to that of the appearance of the successive tran sitions in a package. Resetting thereof constitutes a bringing into phase with respect to the transitions received. The divide-by-2 counter referenced 422 receives the ternary clock signals HT and produces at its output word clock signals HB, whose timing corresponds to that of the appearance of the words of a package. Package reading circuit 52 comprises a series-parallel converter 521 which receives the line signals shaped by circuit 13 and which introduces them sequentially at a timing given by the ternary clock HT, into a memory 522. The transitions memorized word by word are then read at a rate corresponding to the word clock HB and are fed sequentially into the decoder 62 where they are decoded at the same rate. Circuit 43 which forms a time base for the window generator 34 receives the binary clock signals HB supplied by the dividing counter 422, at the level of a dividing counter 432 whose division ratio is such that it produces at an output S' signals whose periodicity corresponds to the timing of the on-line packages. For example, if we take the case of transmission by rotation where, in the same direction, packages of 40 two-element words are separated by intervals corresponding to 88 two-element words, the appearance rate of the packages at reception will correspond to 128 two-element words and consequently a counter 432 will be used which will divide by a ratio n=128 the word clock signal HB.

To produce a window having a 2p element width, counter 432 will output a control signal to the window generator when its count reaches (128−p), i.e. 127 in the case of a window of 2 element widths. Thus, the end of the window will correspond to the time when the counter reaches the count 128 when it resets itself to zero. A circuit 35' detects the first transition present in the window for example by means of a double flip-flop latching circuit. The output signals from circuit 35' are fed to the decision logic circuit 36 at the level of a synchronization criterion-forming circuit 362, preferably through an AND gate 61 which receives from the window generator 34 (or dividing counter 432) a signal whose width is at most equal to an element and representing the end of the window, this signal forming in a way an auxiliary window since its purpose is to inform the criterion about the coincidence between a transition and the end of the window. Thus, one can be sure that the development of the criterion will take place depending on the presence or absence of the first transition at the end of the window. Furthermore, the signals output from circuit 35' are also fed to the input of an OR gate 431 which forms part of circuit 43 and whose output 434 resets the dividing counter 432. This loop allows the window to move back along the package during the search for synchronization. Circuit 362 produces at its output a signal representing the synchronization loss which is fed to the input of an AND gate 363 which also receives the transitions detected at the output of the OR gate 222. The output of the AND gate 363 is connected to the other input of the OR gate 431 whose output resets the dividing counter 432. This looping allows then, in the case of loss or absence of synchronization, the synchronization to be reset to the first on-line transition present.

The output of AND gate 363 is on the one hand connected through a connection 365 to the reset input of the synchronization loss criterion formation circuit 362. The output of the AND circuit 361 feeds, through a connection 367, to the reset input of the dividing counter 422 a synchronization signal for bringing into phase the "word" synchronization. On the other hand, the dividing counter 432 delivers at 435 signals representative of the two-data decoding of its statuses to a circuit 433 for forming an envelope signal HTR corresponding to the beginning and the end of the reception of a package. This signal also forms, at least insofar as its rising front is concerned, a signal representative of the synchronization. It may also be used as an enabling signal for the series parallel converter 521.

Figures 6B, 6C:
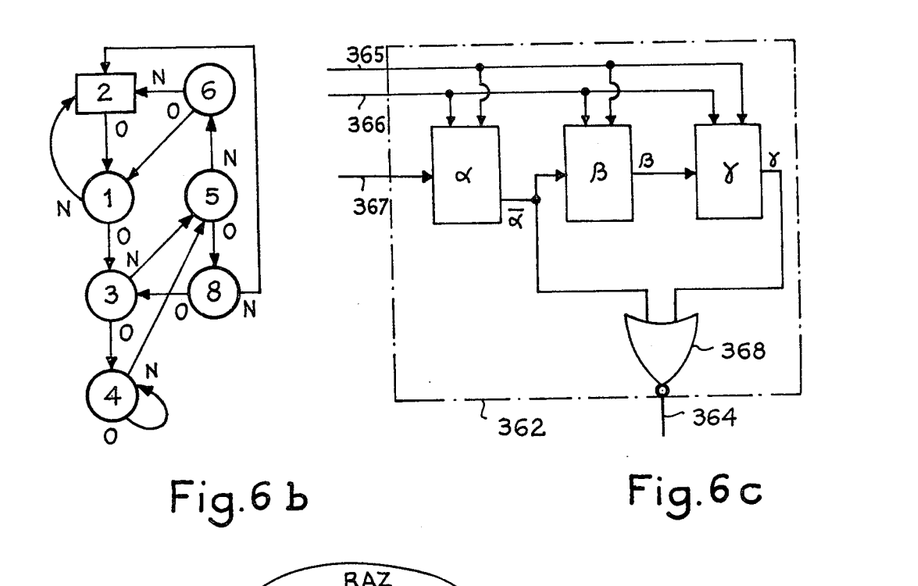

FIG. 6$_b$ shows a criterion example usable in circuit 362. It goes without saying that the use of such criteria is current in transmission technique and therefore this criterion is only given by way of illustration. The choice of such a criterion is in any case a compromise between the speed and the stability of the synchronization.

Position 2 corresponds to an absence of synchronization (search for synchronization). Position 4 looped on itself corresponds to acquired synchronization (holding of the synchronization) after confirmation of the coincidence criterion in three successive windows (2→1→3→4). The intermediate positions (1, 3, 5, 6, 8) thus correspond to the acquisition of the synchronization. This latter takes place either from a synchronization search step 2, or from step 4. When at most two successive coincidence absences occur, a new logic operation for acquiring the synchronization is initiated without modification of the position of the window F. On the other hand, loss of synchronization and the resetting of counter 432 at the first transition detected is caused for example by three successive coincidence absences.

FIG. 6$_c$ is one embodiment of the synchronization loss criterion formation circuit 362, and which is derived from a diagram proposed by the CCITT. It is formed from three flip-flops, $\alpha, \beta$ and $\gamma$ connected as a shift register. A line 366 feeds into the shift register a timing signal at the on-line package tempo elaborated from counter 432 or window generator 34. A line 365 connected to the output of the AND circuit 363 serves for resetting the flip-flops. Line 367 feeds the output of the AND circuit 361 to the input of the $\alpha$ counter so that a zero in the $\alpha$ counter corresponds to a transition detected at the end of a window. The inverted output $\overline{\alpha}$ of the $\alpha$ counter is fed into the $\beta$ counter, and the noninverting output of the $\beta$ counter is fed to the $\gamma$ counter. The operation of the shift register corresponds then to the logic of FIG. 6$_c$.

Figure 6D:
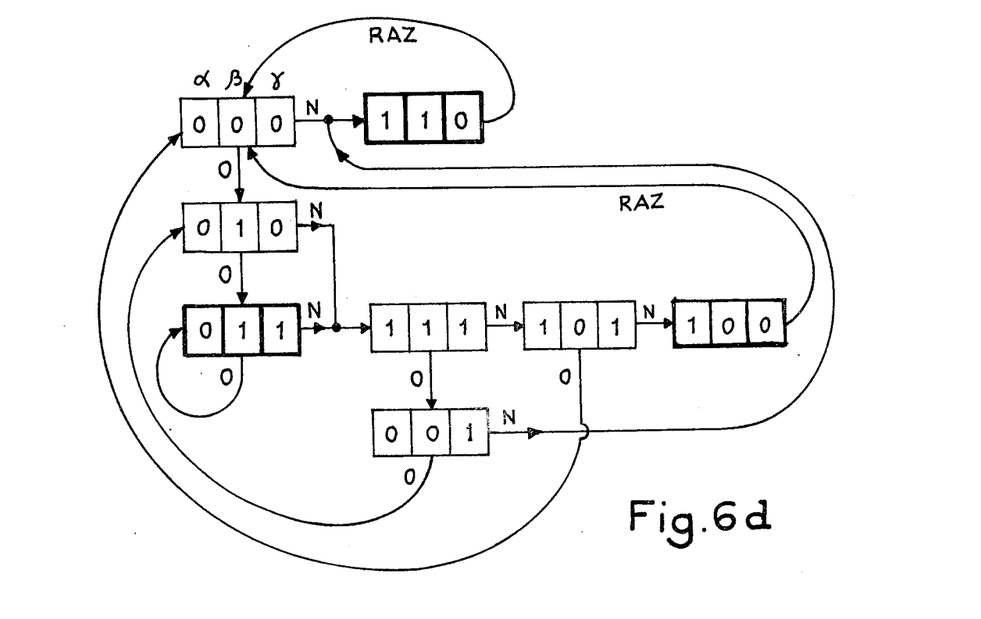

The following strategy will be adopted: there will be loss of synchronization if there is no transition in three consecutive windows from the stable state 011 ($\alpha=0$, $\beta=1$, $\gamma=1$). This corresponds to the identification of state 100, as we saw in the diagram of FIG. 6$_d$. There will also be loss of synchronization and consequently resetting of the counter causing a new search if, from the state 000, there is no transition present in the following window. This corresponds to the state 110. The simultaneous decoding of these two states is carried out when $\alpha=1$ and $\gamma=0$, i.e.: $\alpha \cdot \overline{\gamma}=1$ or $\overline{\alpha+\gamma}=1$.

This detection is accordingly effected by the inverting OR circuit 368 which receives $\overline{\alpha}$ at one of its inputs and $\gamma$ at its other input and whose output 364 forms one of the inputs of the AND circuit 363.

The circuit described in FIG. 6$_a$ presents the disadvantage of resetting the dividing counter 432 systematically in the presence of the first transition in the window. The synchronization remains therefore sensitive to any parasite present in the first part of the window, which presents in practice a slight disadvantage. To avoid this phenomenon, there is associated with the device described in FIG. 6a a circuit 71 producing a second window, called reduced window, Fr, whose beginning is the same as the first window but which is shorter by an element (see FIG. 8). A transition detection logic circuit 72 (see FIG. 7) receives the on-line transitions through a line 423 connected to the output of the OR circuit 222 of FIG. 6a and the reduced window signal Fr and detects their coincidences. The logic circuit 72 only delivers an output signal 74 when at least one transition is present in a certain number of successive reduced windows Fr. This is achieved for example by incrementing, by the transitions present in the reduced window, a counter reset every k packages as well as by the absence of transition in the reduced window Fr. An inhibition circuit 73 receives the transitions present at the output of circuit 35 detecting the first transition in the window and only allows transmission thereof to one of the inputs of the OR circuit 431 whose output resets the dividing counter 432 in the presence of the output signal 74 from the logic circuit 72.

Figure 7:
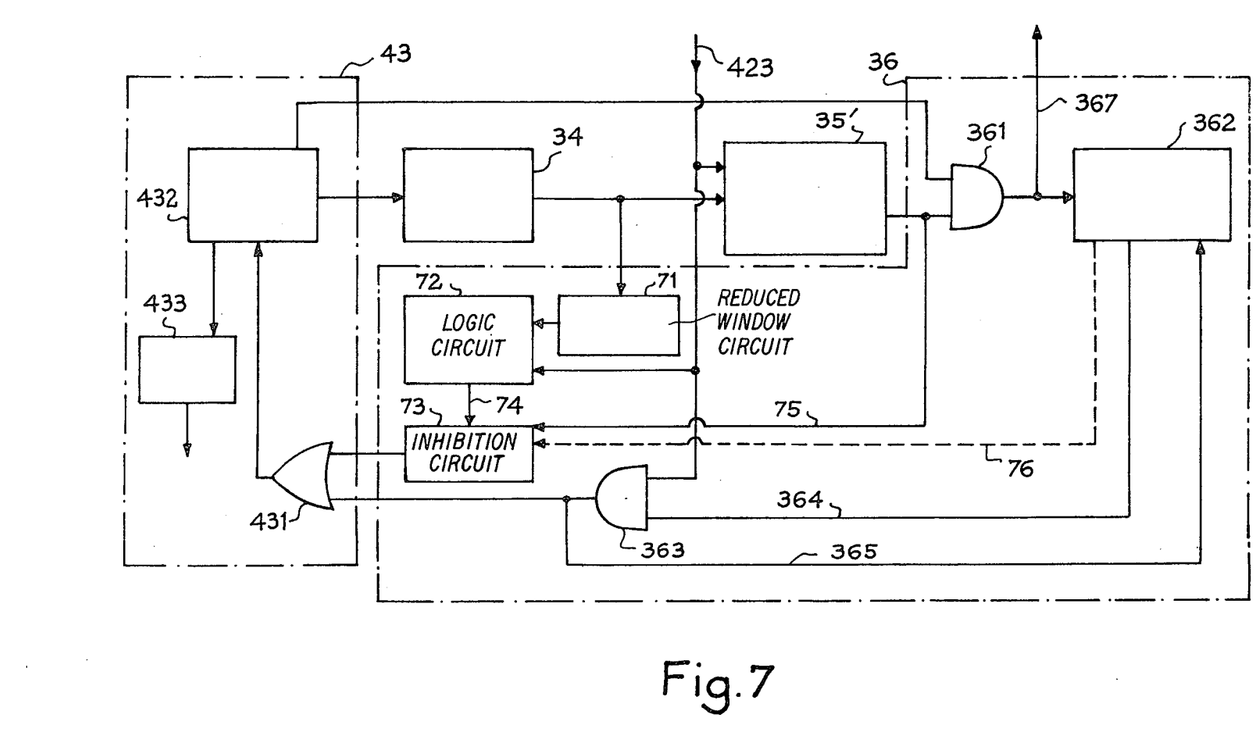
FIG. 7 is a variation of FIG. $6_a$ using a second window called reduced window.
Figure 8:
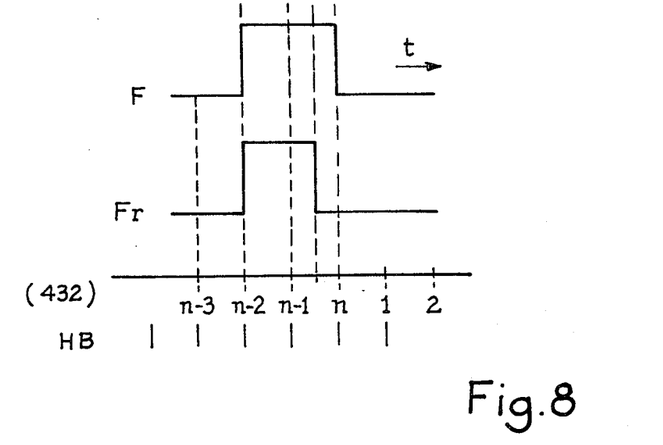
FIG. 8 illustrates the position of said reduced window with respect to the first window.

The circuit described in FIG. 7 makes the synchronization insensitive to any parasite, even present during the duration of the first window. However, permanent operation of the inhibition circuit 73 is likely to disturb to a greater or lesser degree the synchronization search should the first window be caused to move back along successive packages.

To avoid this disadvantage, the synchronization criterion formation circuit 362 decodes a state corresponding for example to an acquired synchronization (011 in the example of FIG. 6d) and produces in this case an enabling signal transmitted over line 76 enabling operation of the inhibition circuit 73.

Figure 9:
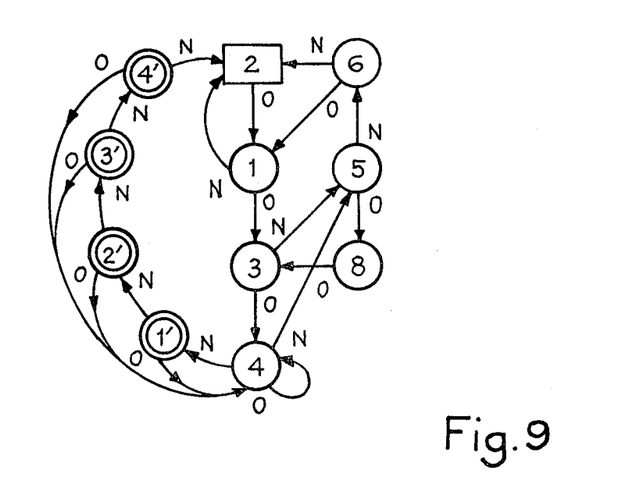
FIG. 9 shows a status diagram corresponding to one use of a reduced window.

A state diagram of the operation with the reduced window is shown in FIG. 9 where return to state 2 only occurs in the presence of 5 successive coincidences detected in the reduced window Fr and only from the acquired synchronization holding state 4.

By way of variation, it is also possible, whether a reduced window is used or not, and when the synchronization is in its acquisition and/or holding phase, to reduce the width of window F to a single element corresponding to the strict confirmation of the synchronization. For example, it is sufficient to detect states 1, 3, 5, 6, 8 and/or 4 (011 for this latter in the example of FIG. 6d) and to use this detection for switching the window generator to an appropriate operating mode.

The invention which has been more particular described in the case of a 1B/2T code may be used with any type of code contemplated, whether the transmission is by rotation or not. Furthermore, it also applies to all transmissions where the packages, of constant or variable length, are repetitive, i.e. that the recovery of the envelope signal HTR does not necessarily use a clock signal, but may be achieved from signals themselves received more especially by direct retrieval of the timing of the transitions.

What is claimed is:

1. A process for synchronizing at reception on-line signals transmitted in packages each of said packages having a plurality of duration elements by detecting the received transitions and by retrieving the timing of the on-line packages, comprising the steps of;

generating signals of a first window of given width at intervals corresponding to the timing of the on-line packages;

detecting at least one transition possibly present in the signals received during the duration of each window and determining if the transitions detected during the duration of each window satisfy given coincidence criterion corresponding to the beginning of each package;

if the criterion is not satisfied, modifying the interval between the beginning of the window signal and the beginning of the next window signal, thus forming a synchronization search step;

if the criterion is satisfied, maintaining said interval equal to said timing of the on-line packages and producing a signal representative of the synchronization, thus forming a synchronization acquisition and holding step.

2. The process as claimed in claim 1, wherein the modification of the interval consists of a reduction thereof.

3. The process as claimed in claim 1, wherein the given coincidence criterion consists of the presence of a transition at the end of the window signal, and the modification of the interval consists in positioning the following window so that the end thereof is separated from the first transition present in the preceding window by an interval equal to the timing of the on-line packages.

4. The process as claimed in claim 1, wherein the synchronization acquisition and holding step comprises a step of logic confirmation of the synchronization leading to logic states respectively of acquisition and holding of the synchronization.

5. The process as claimed in claim 2, wherein, when no transition is detected during the duration of a window, the modification of the interval consists in detecting the first transition present in the signal and in producing a window signal separated in time from the first said transition detected by an interval equal to the timing of the on-line packages.

6. The process as claimed in claim 1, which further comprises an operation for again producing a synchronization search step when said coincidence criterion is not satisfied.

7. The process as claimed in one of the preceding claims, further comprising, during the synchronization holding step, an operation for generating a second window, called reduced window, whose beginning is the same as said window and which is shorter by an interval corresponding to one element and for detecting at least one transition possibly present in said reduced window, the iterative presence of one or more transitions during a given number of times producing a shift of said first window so that the end of the following window is separated in time from the first transition detected in the preceding window by an interval equal to the timing of the on-line packages.

8. The process as claimed in one of claims 4 to 6, comprising logic decoding of the acquisition and/or holding of the synchronization which produces a reduction in width of the window, preferably down to a single element.

9. A device for synchronizing at reception digital signals transmitted in packages each of said packages having a plurality of duration elements, which is provided with a circuit for reading the transitions present in the signal received as well as a circuit for retrieving the timing of the on-line packages, comprising;

a generator producing a first window signal of given width at intervals corresponding to the timing of the on-line packages;

a coincidence detector receiving the signals from the transition reading circuit as well as said window signal and producing at its output a coincidence signal corresponding to the beginning of each package;

a logic decision circuit receiving the coincidence signal and feeding to the window generator;

a signal for decrementing the interval between the beginnings of two successive windows when the coincidence signal does not satisfy a given coincidence criterion; and at least one circuit producing a signal representative of the synchronization.

10. The device as claimed in claim 9, wherein there is further provided a dividing counter receiving the signals from a circuit for retrieving the timing of the on-line transitions and producing a signal for controlling said generator when it reaches a given count equal to its division ratio reduced by a number corresponding to the width of the window.

11. The device as claimed in claim 9, wherein said given coincidence criterion consists in the presence of a transition at the end of the window, wherein said detector delivers at its output only the first transition present in the window and wherein said output is also connected to the reset input of said dividing counter.

12. The device as claimed in claim 10, wherein said logic decision circuit comprises a synchronization criterion formation circuit whose input is connected to the output of said coincidence detector and which produces at its output a signal corresponding to a loss of synchronization, said output being connected to a first input of a first AND circuit whose second input receives the transitions from the signals received and whose output is connected to the reset input of said dividing counter.

13. The device as claimed in claim 12, wherein said synchronization criterion formation circuit comprises counters connected to a shift register having several positions each of which contains a 0 or 1 state, and whose shift timing is controlled by a signal representing the timing of the on-line packages, and at least one logic circuit receiving at its input at least the values of the states from at least two positions and producing at its output at least one signal corresponding to a loss of synchronization.

14. The device as claimed in claim 13, wherein said positions are three in number, the first one ($\alpha$) being incremented by the inverse of the output signal of the coincidence detector, the second ($\beta$) being incremented by the inverse ($\bar{\alpha}$) of the first one ($\alpha$), the third one ($\gamma$) being incremented by the second one, and wherein the logic decoding of $\bar{\alpha}.\bar{\gamma}=1$ produces said signal corresponding to a loss of synchronization.

15. The device as claimed in one of claims 10 to 14, further comprising a second enabling AND circuit receiving at its first input the output of the coincidence detecting circuit and at its second iput an auxiliary window signal representative of the end of the window, and whose output is connected to the input of said synchronization criterion formation logic circuit.

16. The device as claimed in claims 12 to 14, further comprising a generator of a second window, so-called reduced window, whose beginning is the same as said window and which is shorter by an interval corresponding to a transition and a logic circuit detecting the transitions during the duration of said reduced window and an inhibition circuit disposed between the output of the coincidence detector and the reset input of the dividing counter, said inhibition circuit receiving from the logic circuit a disabling signal generated in accordance with a given criterion.

17. The device as claimed in claim 16, wherein said logic circuit comprises a counter whose rate corresponds to the timing of the on-line packages and which is incremented in the presence of a transition in the reduced window, and which is reset in the opposite case, said counter producing at its output a signal for disabling the inhibition circuit when it reaches a predetermined count.

18. The device as claimed in claim 16, wherein said inhibition circuit is enabled by an enabling signal produced by an output of the synchronization criterion formation circuit.

19. The device as claimed in one of claims 9 to 14, wherein the width of the window is such that it corresponds at least to the time interval of (n+1) successive transitions, where n is the maximum number of successive transition absences likely to exist in a package.

20. The device as claimed in claim 19, wherein the width of the window is such that it is equal to two elements more than the maximum number of successive transition absences likely to exist in a package.

21. The device as claimed in one of claims 9 to 14, further comprising;

at least one of a synchronization acquisition and a holding decoding logic circuit; and a means for reducing the width of the window when said logic state is decoded.

22. The device as claimed in claim 21 wherein the reduced width of said window is a single element.

* * * * *